(12) United States Patent
Sonoda et al.

(10) Patent No.: US 6,652,383 B1
(45) Date of Patent: *Nov. 25, 2003

(54) CONNECTION-FIGHTING TYPE GAME MACHINE AND CONNECTION-FIGHTING TYPE GAME METHOD

(75) Inventors: Fumiaki Sonoda, Tokyo (JP); Masanori Mizunuma, Tokyo (JP)

(73) Assignee: Tomy Company Ltd., Tokyo (JP)

( * ) Notice: Subject to any disclaimer, the term of this patent is extended or adjusted under 35 U.S.C. 154(b) by 426 days.

This patent is subject to a terminal disclaimer.

(21) Appl. No.: 09/640,665

(22) Filed: Aug. 18, 2000

Related U.S. Application Data

(63) Continuation of application No. 09/007,656, filed on Jan. 15, 1998, now Pat. No. 6,165,068.

(30) Foreign Application Priority Data

Jan. 22, 1997 (JP) .................................................. 9-9745

(51) Int. Cl.[7] .................................................. A63F 9/22
(52) U.S. Cl. .............................. 463/43; 463/40; 463/42
(58) Field of Search .............................. 463/8, 40–42, 463/43

(56) References Cited

U.S. PATENT DOCUMENTS

| | | | |
|---|---|---|---|
| 4,344,622 A | 8/1982 | Nissim | 273/85 G |
| 4,366,960 A | 1/1983 | Bromley et al. | 273/85 G |
| 4,858,930 A | 8/1989 | Sato | 273/85 G |
| 4,948,126 A | 8/1990 | Drummond | 273/1 GC |
| 4,964,638 A | 10/1990 | Ishida | 273/138 A |
| 5,137,277 A | 8/1992 | Kitaue | 273/85 G |
| 5,184,830 A | 2/1993 | Okada et al. | 273/433 |
| 5,249,800 A | 10/1993 | Hilgendorf et al. | 273/138 A |
| 5,396,225 A | 3/1995 | Okada et al. | 340/825.21 |
| 5,428,528 A | 6/1995 | Takenouchi et al. | 364/410 |
| 5,434,742 A | 7/1995 | Saito et al. | 361/321.5 |
| 5,618,045 A | 4/1997 | Kagan et al. | 463/40 |
| 5,667,220 A * | 9/1997 | Cheng | 273/148 B |
| 5,797,794 A | 8/1998 | Angell | 463/18 |
| 5,885,156 A | 3/1999 | Toyohara et al. | 463/1 |
| 5,890,964 A | 4/1999 | Aoki et al. | 463/44 |
| 5,971,855 A | 10/1999 | Ng | 463/42 |
| 6,165,068 A * | 12/2000 | Sonoda et al. | 463/8 |

OTHER PUBLICATIONS

Game connect, displayed in Tiger Electronics 1998 Catalog, pp. 39, 41 and 114.

* cited by examiner

*Primary Examiner*—Jessica Harrison
*Assistant Examiner*—Carmen D. White
(74) *Attorney, Agent, or Firm*—Nixon & Vanderhye, P.C.

(57) ABSTRACT

A connection-fighting type game machine that enables game character progression when game machines are physically connected together. The connection-fighting type liquid crystal game machine may be connected to another game machine of the same kind. Convex and concave sections of the housing of each machine assist in aligning the machines when they are connected together. A growth degree changing processing section improves the growth degree of the character that has gained a victory, performs a growth degree changing processing by leaving as it is or lowering the growth degree of the character that has suffered a defeat.

4 Claims, 10 Drawing Sheets

CONNECTION-FIGHTING TYPE GAME MACHINE AND CONNECTION-FIGHTING TYPE GAME METHOD

This is a continuation of application Ser. No. 09/007,656, filed Jan. 15, 1998, now U.S. Pat. No. 6,165,068 the entire content of which is hereby incorporated by reference in this application.

BACKGROUND OF THE INVENTION

1. Field of the Invention

The present invention relates to a connection-fighting type game machine with a display such as a liquid crystal display or the like, which is subjected to independent use, or to connected use with an opponent machine, and a corresponding connection-fighting type game method.

2. Description of Related Art

Recently, portable game machines each having a display such as a liquid crystal display (LCD) or the like are now widespread. Game machines of this type include various games such as of shooting games, role playing games, and so on. Most of the above conventional game machines are supposed to be subjected to independent use, that is, played by only one player.

There is known a game machine for two persons' use in which two players operate their operation input sections, respectively, to cause their own characters to fight against each other on the same screen; causing the outcome to be decided, increasing the level of the character which has gained a victory, and decreasing the level which has suffered a defeat.

The independent use type game machine with a display progresses the game with the built-in game contents of the game machine restricted, which causes the progressing manner of the game to be monotonous.

On the other hand, in the conventional fighting type game machine, two players operate their operation input sections, respectively, to cause their own characters to fight against each other on the same screen, thereby resulting in innumerable change of the progressing manner of the game. However, this game machine unexpectedly depends on the operation technique of the operation input section by the player, thereby making the game machine uninteresting for the player having a poor operation technique.

SUMMARY OF THE INVENTION

The invention has been made in view of the above problems. It is an object of the invention to provide a connection-fighting type game machine with a display and a connection-fighting type game method which provide a varying progress of the game, and provide added amusement.

In accordance with one aspect of the invention, the connection-fighting type game machine which is subjected to independent use, or to connected use with an opponent machine includes a growth processing section for letting a built-in character gain imaginary experience by an interactive operation of the player through an operation input section in the case of independent use. A storing section stores growth degree information of the characters grown by the growth processing section, and a connection terminal enables the direct connection with the opponent machine. An outcome processing section reads out the growth degree information of the character stored in the storing section reads out the growth degree information of the character stored in the storing section of the opponent machine, and causes the user's character and the character for the opponent machine to fight against each other according to a predetermined fighting manner based on the growth degree information of the user's character and the growth degree information of the opponent's character to determine the outcome, in the case of the connected use with the opponent machine.

The game machine also includes a growth degree changing processing section for performing a growth degree changing processing of changing at least one of the growth degree of the character which has been judged to gain a victory and the growth degree of the character which has been judged to suffer a defeat, storing the growth degree information of the user's character obtained after the growth degree changing processing in the user's storing section, and storing the growth degree information of the opponent's character obtained after the growth degree changing processing in the opponent's storing section. A display section displays a growth progress of the user's character according to an instruction from the user's growth processing section and displays a fighting result according to an instruction from the growth degree changing processing section. Finally, a control section judges the connection state with the opponent machine, activates the growth processing section, inactivates the outcome processing section and the growth degree processing section of the user's machine when judging that the machines are in the non-connection state, and inactivates the growth processing section and deciding the priority of performing the fight processing with the opponent machine when judging that the machines are in the connection state. The control section also activates the fight processing section and the growth degree changing processing section when the user's machine is high in the priority of performing fight processing.

The growth degree information may include a level value corresponding to a total amount of the imaginary experience, and an attribute value which are determined according to experience amounts by the kinds of the imaginary experiences.

The control section may determine, if receiving a fight processing requirement from the operation input section of the user's machine when not receiving a fight processing reserving requirement information from the opponent machine in the connection state with the opponent machine, that the user's machine is high in the priority of executing fight processing, then informs a fight processing reserving requirement information to the opponent machine, to thereby activate the outcome processing section and the growth degree changing processing section of the user's machine.

The growth degree changing processing section may be adapted to decrease the growth degree of the character for the user's machine when there is no input from the operation input section during a predetermined time in the case of the independent use.

In accordance with another aspect of the invention, the connection-fighting type game method which is subjected to independent use, or to connected use with an opponent machine, includes a first step of letting a built-in character gain imaginary experience by an interactive operation of a player through an operation input section in the case of independent use; a second step of storing a growth degree information of the grown character; and a third step of performing the connection with the opponent machine. In a fourth step, a priority of executing a fight processing with the opponent machine is decided, and an outcome processing section and a growth degree changing processing section of the user's machine are activated when the user's machine is high in the priority of executing fight processing.

The method also includes a fifth step of reading out a growth degree information of the character for the user's machine stored in the storing section of the user's machine, reading out the growth degree information of the character stored in the storing section of the opponent machine, and causing the character for the user's machine and the character for the opponent machine to fight against each other according to a predetermined fighting manner based on the growth degree information of the character for the user's machine and the growth degree information of the character for the opponent machine to thereby determine the outcome.

Finally, in a sixth step, a growth degree changing processing of changing at least one of the growth degree of the character which has been judged to gain a victory and the growth degree of the character which has been judged to suffer a defeat is performed, along with storing the growth degree information of the character for the user's machine obtained after the growth degree changing processing in the user's machine, and storing the growth degree information of the character for the opponent machine obtained after the growth degree changing processing in the opponent machine.

According to such a connection-fighting type game machine with a display or such a connection-fighting type game method, a player can enjoy the conventional role playing game in the case of independent use, and then can fight with the character having the growth degree which is not known by itself in connected use with the opponent machine. Moreover, in this case, the outcome can be determined irrespective of the skill of the operation technique for the operation input section, so that all plays can enjoy the game.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Figure 1:
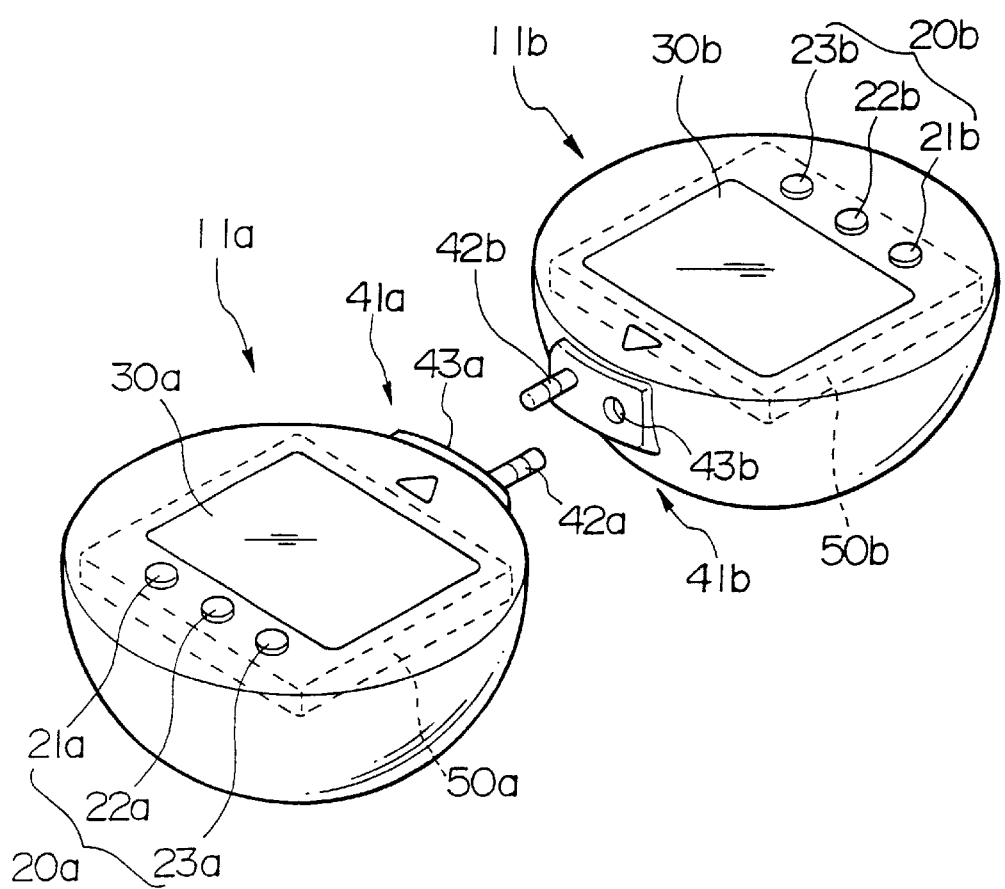
FIG. 1 is a perspective view of a connection-fighting type liquid crystal game machine according to an embodiment of the invention.

A connection-fighting type game machine with a display and a connection-fighting type game method, according to embodiments of the present invention will now be described with reference to the appended drawings. Incidentally, in explaining the drawings, the same elements and parts are designated by the same reference numerals, and therefore the descriptions thereof to be repeated are omitted.

FIG. 1 is an exterior view of a connection-fighting type game machine having a liquid crystal display, according to an embodiment of the invention. In FIG. 1, two game machines 11a and 11b are represented as viewed from the different directions in order to clarify a connecting manner of the game machine according to the embodiment of the invention. The game machine 11a and the game machine 11b are quite identical in construction with each other. The construction of the game machine 11a will now be described. Elements and parts of the game machine 11b, corresponding to those of the game machine 11a, each has a reference numeral with the suffix b instead of the suffix a, the description of which is therefore omitted.

As shown in FIG. 1, the game machine 11a according to the present embodiment comprises (a) an operation input section 20a having keys 21a, 22a and 23a by which a player inputs information, (b) a liquid crystal display section 30a for displaying the growth processing of the character for the user's machine and the fighting progress with the character for the opponent machine, and the outcome of the fight, and (c) a connection section 41a having a plug 42a and a receiving port 43a for the purpose of direct connection with the opponent machine. The operation input section 20a, the liquid crystal display section 30a, and the connection section 41a are connected to a built-in processing section 50a.

The connection section 41a includes the plug 42a and the receiving port 43a. At the time of connection, the plug 42a is connected to the receiving port 43b, and the plug 42b is connected to the receiving port 43a.

Figure 2:
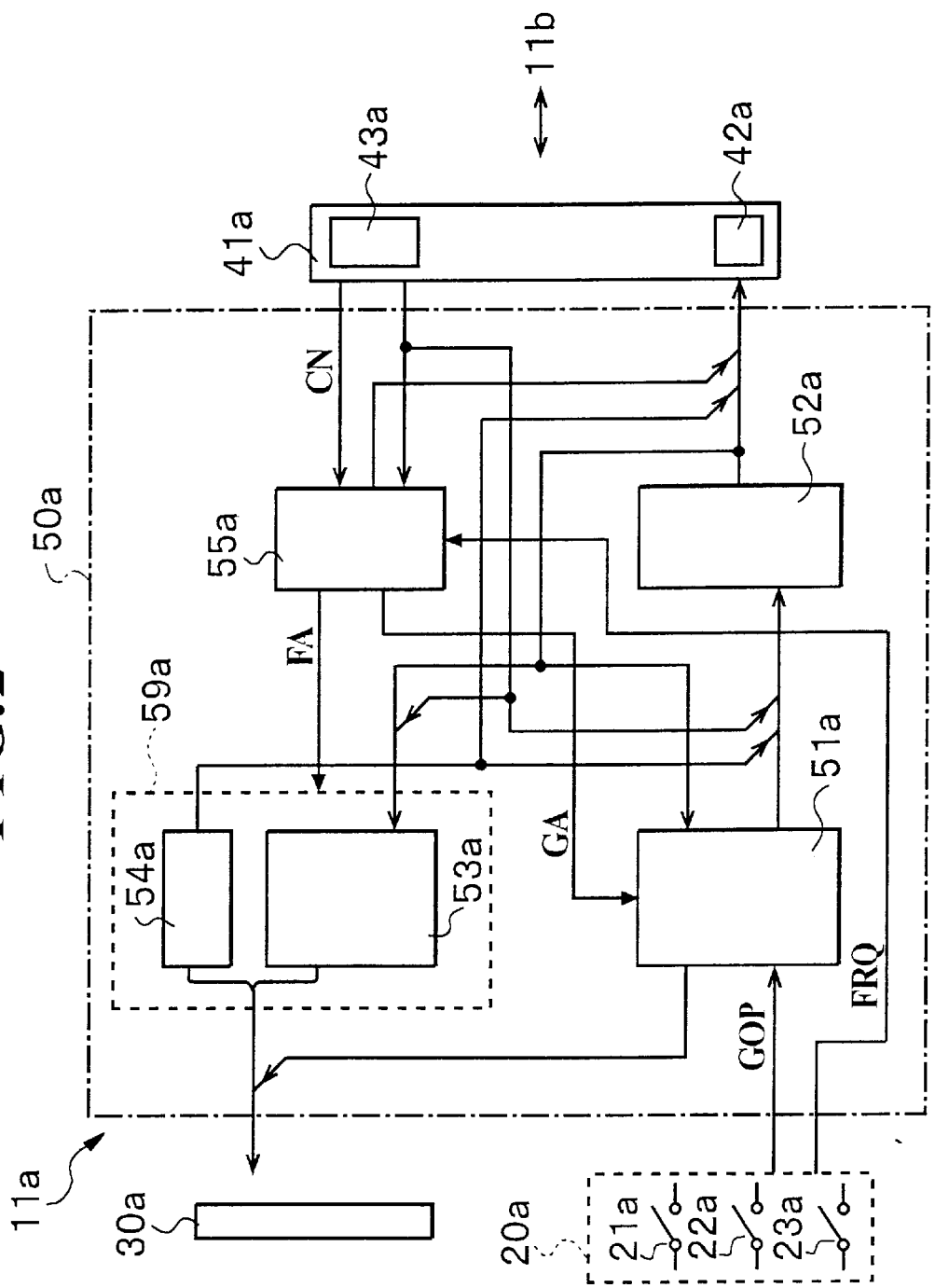
FIG. 2 is a functional block diagram of the connection-fighting liquid type crystal game machine according to the embodiment of the invention.

FIG. 2 is a functional block diagram of the game machine 11a. As shown in FIG. 2, the processing section 50a comprises (a) a growth processing section 51a for letting a built-in character gain imaginary experience by an interactive operation of the player through an operation input section 20a in the case of independent use, (b) a storing section 52a for storing growth degree information of the characters grown by the growth processing section 51a, (c) a fight processing section 59a for performing a fight processing in the case of connected use with the opponent machine 11b, (d) a control processing section 55a for receiving a connection state signal CN to judge the connection state with the opponent machine 11b, making a growth activating signal GA significant to activate the growth processing section 51a and making a fight activating signal FA insignificant to inactivate the fight processing section 59a when judging that the machines are in the non-connection state, making the growth activating signal GA insignificant to inactivate the growth processing section 51a and determining the priority of performing the fight processing with the opponent machine 11b when judging that the machines are in the connection state, and making the fight activating signal FA insignificant to activate the fight processing section 59a when the user's machine 11a is high in the priority of performing fight processing.

The fight processing section 59a comprises (i) an outcome processing section 53a for reading out the growth degree information of the character for the user's machine 11a stored in the storing section 52a of the user's machine 11a, reading out the growth degree information of the character for the opponent machine 11b stored in the storing section 52b of the opponent machine 11b, and causing the character of the user's machine 11a and the character of the opponent machine 11b to fight against each other according to a predetermined fighting manner based on the growth degree information of the character for the user's machine 11a and the growth degree information of the character for the opponent machine 11b to determine the outcome, (ii) a growth degree changing processing section 54a for performing a growth degree changing processing of improving the growth degree of the character which has been judged to gain a victory relative to the growth degree of the character which has been judged to suffer a defeat, storing the growth degree information of the character for the user's machine 11a obtained after the growth degree changing processing in the storing section 52a of the user's machine 11a, and storing the growth degree information of the character for the opponent machine 11b obtained after the growth degree changing processing in the storing section 52b of the opponent machine 11b.

It is preferred that the storing section 52a is provided with a combination of electrically erasable/programmable read only memories (EEPROM) and static random access memories (SRAM), and a back-up battery.

A growth operation information GOP out of the input information from the operation input section 20a is input to the growth processing section 51a, and a fight processing requirement signal FRQ is input to the control processing section 55a. The growth degree information is then input to the growth processing section 51a from the storing section 52a.

Display information is input to the liquid crystal display output section 30a from the growth processing section 51a or the fight processing section 59a.

The growth degree information is input to the storing section 52a from the opponent machine 11b via the growth processing section 51a, the growth degree changing processing section 54a or the connecting section 41a.

The growth degree information is input to the outcome processing section 53a from the opponent machine 11b via the storing section 52a or the connection section 41a.

The fight processing reserving information is input to the control processing section 55a from the opponent machine 11b via the connection section 41a.

The growth degree changing information from the storing section 52a or the growth degree changing processing section 54a, or the fight processing reserving requirement information from the control processing section 55a is input to the connection section 41a, then informed to the opponent machine 11b.

The game machines 11a and 11b according to the present embodiment execute a connection-fighting type game method according to the embodiment of the invention in the following manner.

Figure 3:
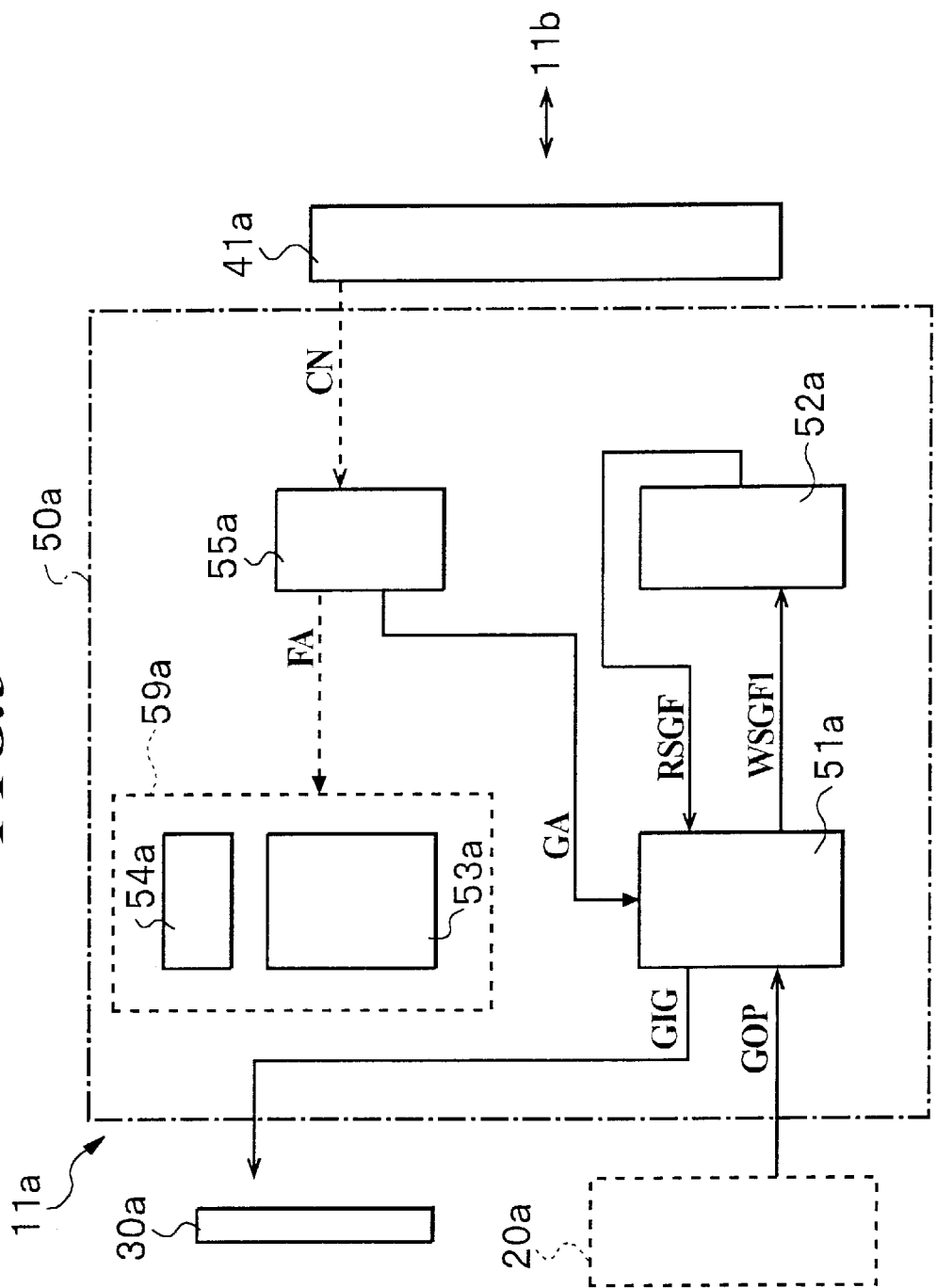
FIG. 3 is an explanatory view of a case in which the connection-fighting type liquid crystal game machine according to the embodiment is in a state of independent use.

First, the game machine 11a and the game machine 11b are used individually. The mode in which the game machine 11a is independently used will be described hereinbelow. FIG. 3 is an explanatory view of a case in which the game machine is in a state of independent use.

When the game machine 11a is independently used, the opponent machine 11b is not connected to the game machine 11a, so that the connection instructing signal CN is insignificant (illustrated by a dotted line). Since the connection instructing signal CN is insignificant, the control processing section 55a determines that the machine is in the non-connection state, makes the growth activating signal GA significant (illustrated by the solid line) to activate the growth processing section 51a and makes the fight activating signal FA insignificant to inactivate the fight processing section 59a. In this way, the operating mode is set to the growth mode of growing the built-in character.

Next, when the operating mode is in the growth mode, the player inputs growth operating information GOP to thereby grow the character by operating the operation input section 20a in an interactive manner while watching the liquid crystal display output section 30a. The growth processing is displayed on the liquid crystal display output section 30a to which is input a growth processing information GIG output from the growth processing section 51a.

The operation (growth operation) of growing the character is suitably selected from various operations including, e.g., (i) giving the character something to eat (recovering a life value), (ii) letting the character play (letting the character gain experience), (iii) giving an injection or feeding herb when falling ill or injured (removing growth inhibiting factors, such as life value decreasing factors), (iv) training the character (letting the character gain experience), and (v) causing the character to fight against the opponent (letting the character gain experience).

The player operates the operation input section 20a at its own discretion to store the growth degree information WSGF1 of the grown-up character into the storing section 52a.

Then, the growth degree information can include only a level value corresponding to a total amount of experience which the character has obtained according to its growth, and can include an attribute value which is determined according to the experience values by the kinds of the experiences.

When further growing the character which has been stored in the storing section 20a, the player first operates the operation input section 20a to thereby read out growth information RSGF of the character from the storing section 20a, which is transmitted to the growth processing section 51a. Subsequently, the player executes the growth operation again starting from the result read out by the preceding operations, to thereby further grow the character. The player then operates the operation input section 20a based on its discretion to thereby store growth degree information WSGFI of the character, which has been accumulatively grown, in the storing section 20a.

Figure 4:
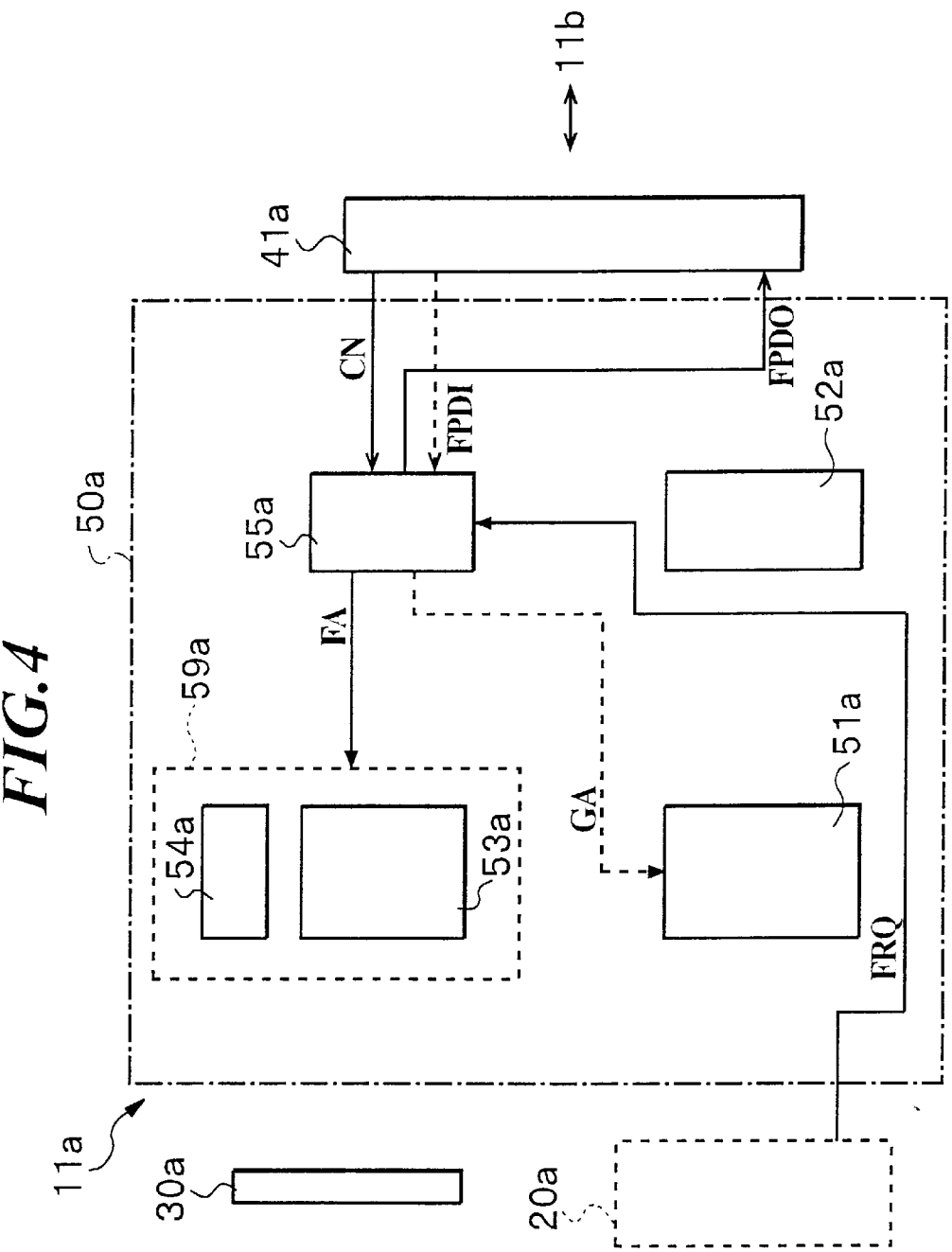
FIG. 4 is an explanatory view of a case in which the fight arbitration is processed when the connection-fighting type liquid crystal game machine according to the embodiment is in a connected state.

Next, the machine 11a is connected to the opponent machine 11b through the connection section 41a. FIG. 4 is an explanatory view of a case in which the fight arbitration is processed. The connection to the opponent machine 11b makes the connection state signal CN significant; therefore the control processing section 55a is determined to be in the connection state, which makes the growth activating signal GA and the fight activating signal FA insignificant to thereby causes the growth processing section 51a and the fight processing section 59a to be inactivated. At the same time, the control processing section 55b of the opponent machine 11b is determined to be in the connection state, which causes the growth processing section 51b and the fight processing section 59b to be inactivated.

After that, the control processing section 55a determines the priority of executing fight processing in association with the control processing section 55b of the opponent machine 11b.

In this process, the control processing section 55a determines, if receiving the control fight processing requirement FRQ from the operation input section 20 when not receiving a fight processing reserving requirement information FPDI from the opponent machine 11b in the connection state with the opponent machine 11b, that the user's machine 11a is high in the priority of executing fight processing, then the control processing section 55a informs a fight processing reserving requirement information FPDO to the opponent machine 11b, then makes the fight activating signal FA significant to thereby activate the fight processing section 59a.

Figure 5:
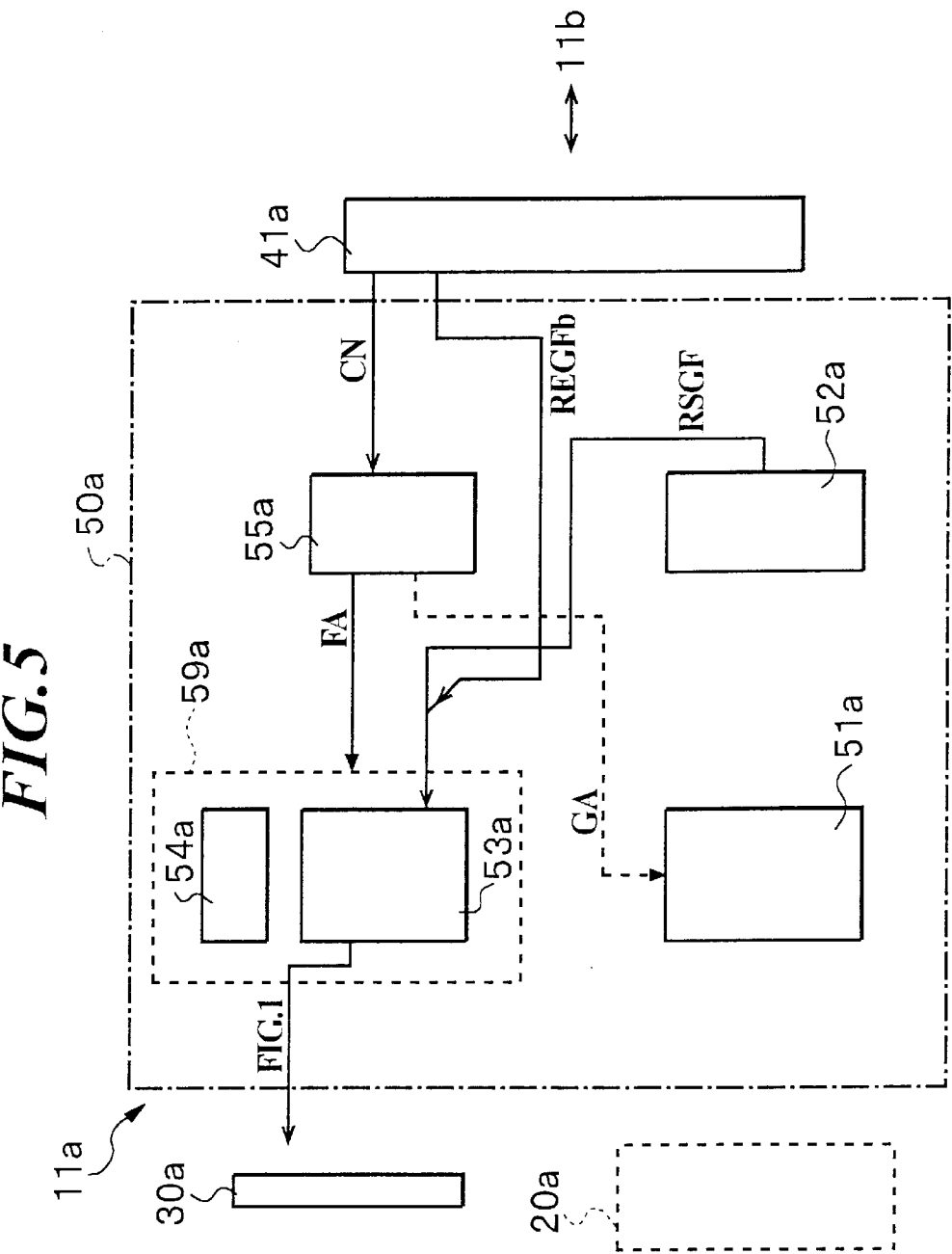
FIG. 5 is an explanatory view of a case in which the outcome is processed when the connection-fighting type liquid crystal game machine according to the embodiment is in a connected state.

In the activated fight processing section 59a, the outcome processing section 53a first executes the outcome processing. FIG. 5 is an explanatory view of a case in which the outcome is processed.

In executing the outcome processing, the outcome processing section 53a reads out the growth degree information RSGF of the character for the user's machine stored in the storing section 52a, and reads out growth degree information REGFb of the character stored in the storing section 52b through the connection section 41a, and causes the character of the user's machine 11a and the character for the opponent machine 11b to fight against each other according to a predetermined fighting manner, based on the growth degree information of the character for the user's machine 11a and the growth degree information of the character for the opponent machine 11b, and then determines the outcome.

As the predetermined fighting manner, a simple electronic roulette manner or a simple electronic dice manner can be employed where the growth degree information comprises, e.g., only a level value, set according to the level values of both game machines. A more complicated electronic roulette manner or a more complicated electronic dice manner can be employed where the growth degree information comprises, e.g., a level value and an attribute value, set according to the level values and the attribute values of both game machines.

The outcome processing section 53a displays fighting progress information and outcome information FIG. 1 as the fighting result.

Figure 6:
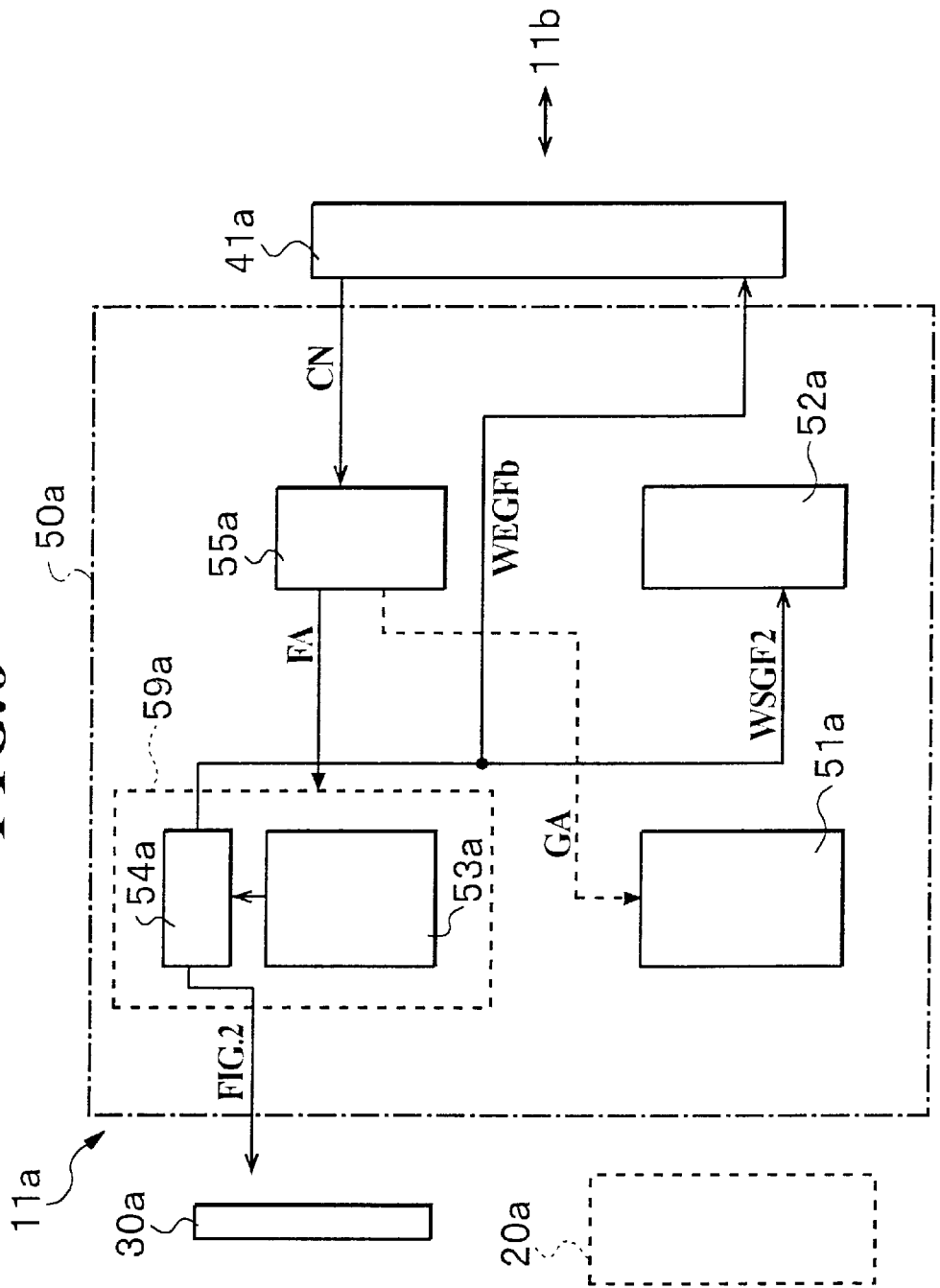
FIG. 6 is an explanatory view of a case in which the growth degree changing is processed when the connection-fighting type liquid crystal game machine according to the embodiment is in a connected state.

When the outcome of the fight is decided, the growth degree changing processing section 54a executes the growth degree changing processing. FIG. 6 is an explanatory view of a case in which the growth degree changing is processed.

In the growth degree changing processing, the growth degree changing processing section 54a generates the growth degree information obtained by the fight processing section 53a improving the growth degree of the character which has been judged to gain a victory by the outcome processing section 53a, and generates the growth degree information obtained by the fight processing section 53a leaving as it is or lowering the growth degree of the character which has been judged to suffer a defeat.

For example, the character which has been judged to gain a victory gains the increased experience value, the improved level, or the increased attribute value. On the other hand, the character which has been judged to suffer a defeat gains the maintained growth degree as it is, the decreased experience value, the lowered level, or the decreased attribute value. For example, the character which has been judged to suffer a defeat takes a disease or gets a wound, or degenerates.

After that, the growth degree changing section 54a stores growth degree information WSGF2, obtained after the change of the character for the user's machine 11a, in the storing section 52a, stores growth degree information WSGFb, obtained after the change of the character for the opponent machine 11b, in the storing section 52b through the connection section 41b, and displays the growth degree changing information FIG2 on the liquid crystal display output section 30a as the fighting result, followed by terminating the fight processing.

Figure 7:
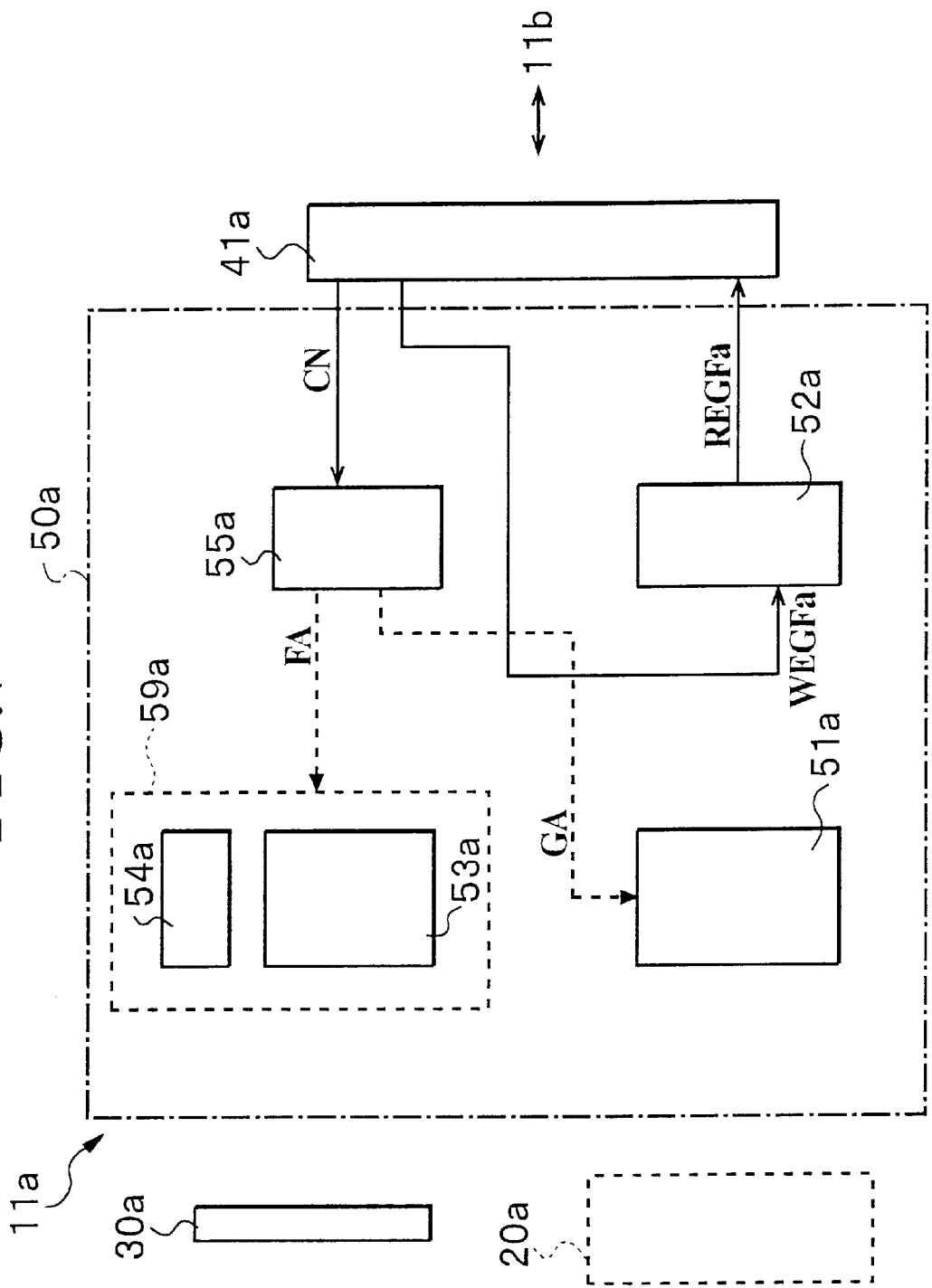
FIG. 7 is an explanatory view of a case in which the fight processing is processed with the opponent machine taking the initiative.

In the connection state, when the control processing section 55a receives fight processing reserving requirement information FPDI through the connection section 41a before the fight processing requirement FRQ is transmitted to the control processing section 55a from the operation input section 20a, the control processing section 55a determines, even if receiving the fight processing requirement FRQ from the operation input section 20a thereafter, that the user's machine is high in priority executing the fight processing, to thereby ignore the fight processing requirement FRO transmitted from the operation input section 20a. That is, the fight processing is executed with the opponent machine 11b taking the initiative, with the fight processing section 59a inactivated. FIG. 7 is an explanatory view of a case in which the fight processing is executed with the opponent machine 11b taking the initiative.

As shown in FIG. 7, the user's machine 11a does not actively execute the fight processing at all, outputs a character growth degree information REGFa of the user's machine 11a stored in the storing section 52a through the connection portion 41a according to the requirement from the opponent machine 11b, and stores character growth degree information WEGFa of the user's machine 11a, which has been changed after the fight and then transmitted from the opponent machine 11b through the connection section 41a, according to the instruction of the opponent machine 11b.

After that, both machines are separated from each other, causing the connection state to be changed to the non-connection state, which causes the machine to be again in the independent use state. In this manner, the player's growth operation grows the character until the next fight.

As described above, the game machine can be played as is the case with the conventional role playing game in the case of independent use, and can fight with the character having the unknown growth degree in the case of connected use.

Moreover, so long as the meal, the training and the like are neglected during a predetermined time even if the outcome processing is executed, the machine might as well suffer a defeat, thereby decreasing the experience value, lowering the level, or decreasing the attribute value.

Figure 8:
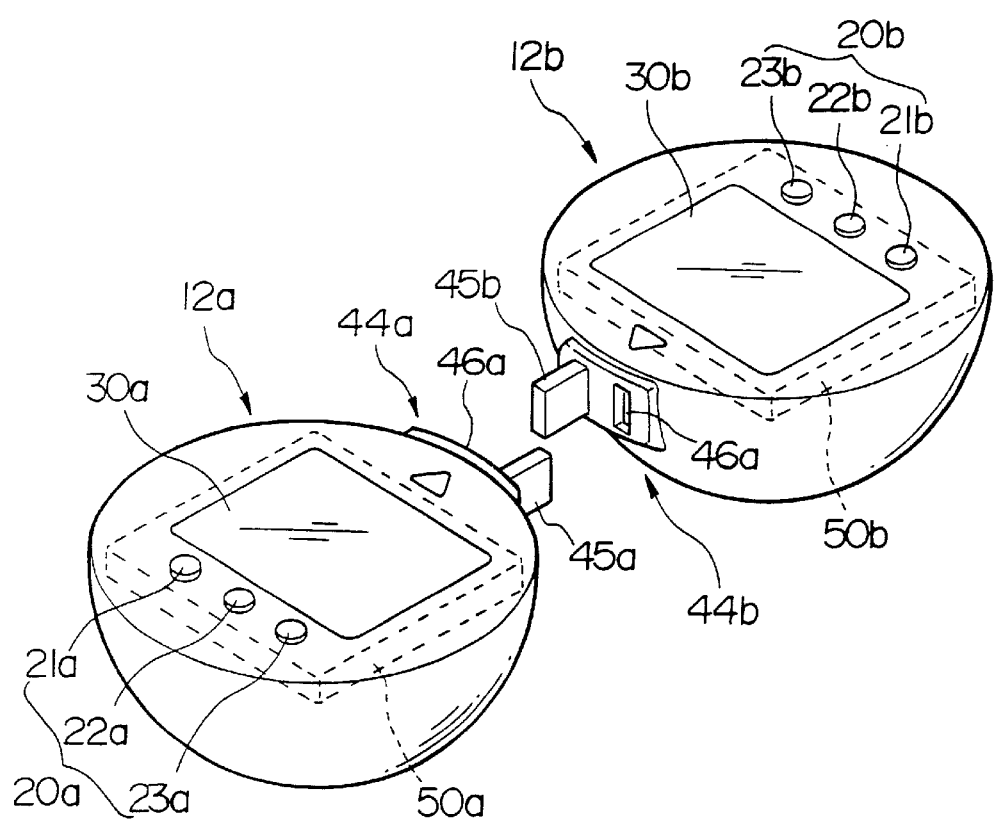
FIG. 8 is a general arrangement of a connection-fighting type liquid crystal game machine according to a first variant example of the embodiment of the invention.
Figure 9A:
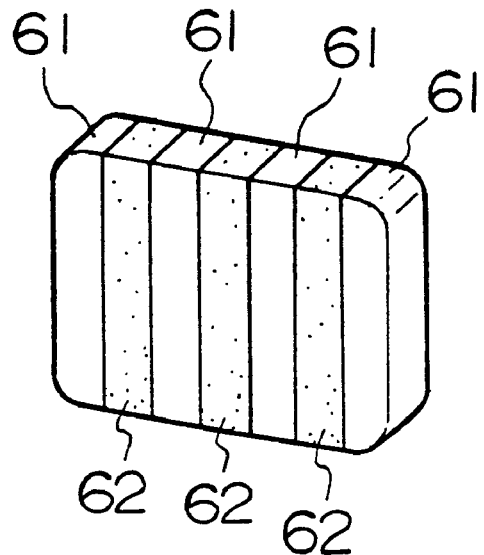
FIG. 9A is a perspective view of an embodiment of the plug.
Figure 9B:
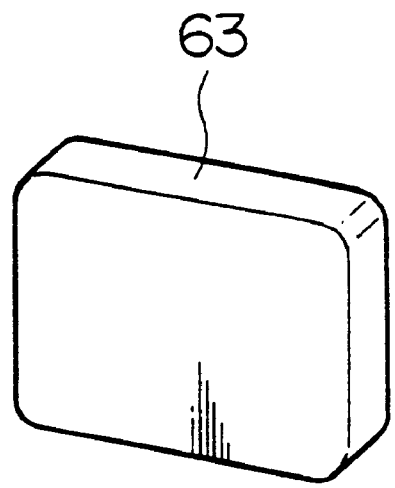
FIG. 9B is a perspective view of another embodiment of the plug.
Figure 10:
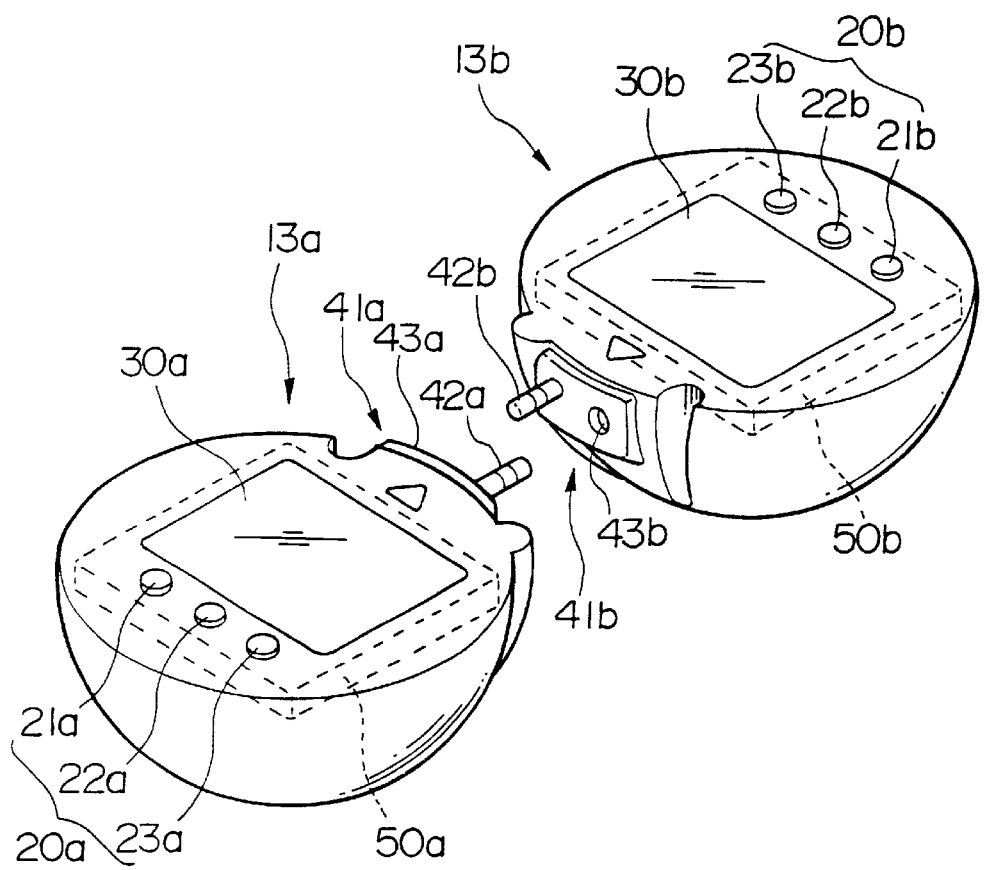
FIG. 10 is a general arrangement of a connection-fighting type liquid crystal game machine according to a second variant example of the embodiment of the invention.

The invention is not limited to the above-mentioned embodiment. For example, although, in the above embodiment, the plug 42 is shaped in a cylinder with the receiving port 43 complementary thereto, the game machine 12 is made in such a manner that the plug 45 may be shaped in a rectangular parallelepiped with the receiving port 46 complementary thereto, as shown in FIG. 8. Moreover, a rubber contact can be employed in which the energizing rubber 61 and an insulation rubber 62 are laminated in a sandwich manner as shown in FIG. 9A, or a metal contact comprising a metal 63 as shown in FIG. 9B. The same contact can be employed for the plug 42. Further, as shown in FIG. 10, a convex section and a concave section are disposed on the main body around the connection section 41, thereby causing the game machines 13 to be physically fixed.

As described in detail above, according to the connection-fighting type game machine with a display and the connection-fighting type game method of the invention, the player can enjoy one-player-gaming while growing the character for the user's machine as is the case with the conventional role playing game in the case of independent use, and then can enjoy two-player-gaming causing the character grown by itself and the character grown by the opponent to fight against each other.

What is claimed is:

1. A connection-fighting type game machine which is used by being connected with an opponent machine or which is used independently, the game machine comprising:

a storing section for storing growth degree information of a character for a user's machine;

a connection terminal for performing a direct connection with the opponent machine;

a convex section and a concave section disposed on a main body of the game machine around the connection terminal; and an outcome processing section for making the character for the user's machine fight against a character for the opponent machine according to a predetermined fighting manner, on the basis of the growth degree information of the character for the user's machine and growth degree information of the character for the opponent machine to judge an outcome of victory or defeat of the fighting, during connected use with the opponent machine, wherein the convex section and the concave section of the main body are engaged with a concave section and a convex section disposed on a main body of an opponent machine when the game machine is connected with the opponent machine.

2. The connection-fighting type game machine as claimed in claim 1, further comprising a growth degree changing processing section for performing a growth degree changing processing for changing the growth degree of the character for the user's machine according to the outcome of victory or defeat of the fighting which has been judged by the outcome processing section, and for storing the growth degree information obtained after the growth degree changing processing, of the character for the user's machine, into the storing section of the user's machine.

3. The connection-fighting type game machine as claimed in claim 1, further comprising a display section for displaying a growth progress of the character for the user's machine and displaying the outcome of the fighting.

4. A connection-fighting type game machine which is used by being connected with an opponent machine or which is used independently, the game machine comprising:

a growth processing section for letting a built-in character gain imaginary experience to grow by an interactive operation of a user through an operation input section during independent use;

a storing section for storing growth degree information of the character grown by the growth processing section;

a connection terminal for performing a direct connection with the opponent machine;

a convex section and a concave section disposed on a main body of the game machine around the connection terminal; and an outcome processing section for making the character for the user's machine fight against a character for the opponent machine according to a predetermined fighting manner on the basis of the growth degree information of the character for the user's machine and growth degree information of the character for the opponent machine to judge an outcome of victory or defeat of the fighting, during connected use with the opponent machine, the growth degree information of the character for the user's machine being stored in the storing section of the user's machine, wherein the convex section and the concave section of the main body are engaged with a concave section and a convex section disposed on a main body of an opponent machine when the game machine is connected with the opponent machine.

\* \* \* \* \*